United States Patent
Sundet et al.

(10) Patent No.: US 8,033,175 B2
(45) Date of Patent: Oct. 11, 2011

(54) TEMPERATURE COMPENSATION OF A MULTIVARIABLE PRESSURE TRANSMITTER

(75) Inventors: Paul C. Sundet, Savage, MN (US); Mark C. Fandrey, Eden Prairie, MN (US)

(73) Assignee: Rosemount Inc., Eden Prairie, MN (US)

( * ) Notice: Subject to any disclaimer, the term of this patent is extended or adjusted under 35 U.S.C. 154(b) by 352 days.

(21) Appl. No.: 12/472,780

(22) Filed: May 27, 2009

(65) Prior Publication Data
US 2009/0293625 A1 Dec. 3, 2009

Related U.S. Application Data

(60) Provisional application No. 61/056,082, filed on May 27, 2008.

(51) Int. Cl.
*G01L 13/02* (2006.01)
(52) U.S. Cl. ............................................. 73/708; 73/716
(58) Field of Classification Search ........................ None
See application file for complete search history.

(56) References Cited

U.S. PATENT DOCUMENTS

| | | | | |
|---|---|---|---|---|
| 5,495,769 | A * | 3/1996 | Broden et al. | 73/718 |
| 5,554,809 | A * | 9/1996 | Tobita et al. | 73/700 |
| 5,899,962 | A * | 5/1999 | Louwagie et al. | 702/138 |
| 5,960,375 | A | 9/1999 | Warrior et al. | 702/104 |
| 6,182,019 | B1 | 1/2001 | Wiklund | 702/100 |
| 6,529,847 | B2 * | 3/2003 | Hamilton et al. | 702/127 |
| 2005/0066703 | A1 | 3/2005 | Broden et al. | 73/1.57 |
| 2007/0193369 | A1* | 8/2007 | Evans et al. | 73/861.52 |

FOREIGN PATENT DOCUMENTS

| | | |
|---|---|---|
| EP | 0 919 796 | 6/1999 |
| WO | WO 85/04474 | 10/1985 |

OTHER PUBLICATIONS

International Search Report and Written Opinion for foreign application No. PCT/US2009/045293, dated Sep. 2, 2009.

* cited by examiner

*Primary Examiner* — Andre Allen
(74) *Attorney, Agent, or Firm* — Christopher R. Christenson; Westman, Champlin & Kelly, P.A.

(57) ABSTRACT

A multivariable process fluid pressure transmitter includes an electronics module and a sensor module. The sensor module is coupled to the electronics module. A process fluid temperature sensor is coupled to the process fluid pressure transmitter. A differential pressure sensor is disposed within the sensor module and is operably coupled to a plurality of process fluid pressure inlets. A static pressure sensor is also disposed within the sensor module and is operably coupled to at least one of the process fluid pressure inlets. A first temperature sensor is disposed within the sensor module and is configured to provide an indication of a temperature of the differential pressure sensor. A second temperature sensor is disposed within the sensor module and is configured to provide an indication of a temperature of the static pressure sensor. Measurement circuitry is operably coupled to the differential pressure sensor, the static pressure sensor, and the first and second temperature sensors. A processor is coupled to the measurement circuitry and is configured to provide a compensated differential pressure output based on a measurement of the differential pressure sensor and the first temperature sensor, and to provide a compensated static pressure output based on a measurement of the static pressure sensor and the second temperature sensor.

15 Claims, 5 Drawing Sheets

TEMPERATURE COMPENSATION OF A MULTIVARIABLE PRESSURE TRANSMITTER

CROSS-REFERENCE TO RELATED APPLICATION

The present application is based on and claims the benefit of U.S. provisional patent application Ser. No. 61/056,082, filed May 27, 2008, the content of which is hereby incorporated by reference in its entirety.

BACKGROUND

In industrial settings, control systems are used to monitor and control inventories of industrial and chemical processes and the like. Typically, the control system performs these functions using field devices distributed at key locations in the industrial process coupled to the control circuitry in the control room by a process control loop. The term "field device" refers to any devices that perform a function in a distributor control or process monitoring system used in the measurement, control, and monitoring of industrial processes. Typically, field devices are characterized by their ability to operate outdoors for extended periods of time, such as years. Thus, a field device is able to operate in a variety of climatological extremes, including severe temperature extremes and extremes in humidity. Moreover, field devices are able to function in the presence of significant vibration, such as vibration from adjacent machinery. Further, field devices may operate in the presence of electromagnetic interference.

One example of a field device is a multivariable process fluid pressure transmitter, such as that sold under the trade designation Model 3051 Multivariable Transmitter by Emerson Process Management of Chanhassen, Minn. Multivariable process fluid pressure transmitters can be used for a variety of purposes including the computation and reporting of process fluid mass flow. A multivariable process fluid pressure transmitter will generally have a process fluid differential pressure sensor as well as a static pressure sensor. Measuring both differential pressure and static pressure of the process fluid as the process fluid passes through a differential pressure generator, such as an orifice plate, provides important information regarding process fluid flow.

Multivariable process fluid pressure transmitter performance is sometimes influenced by temperature induced errors. The sources of these temperature-induced errors can be the sensor measurement electronics, sensor oil fill system, and the pressure sensing elements themselves. The performance of a multivariable process fluid pressure transmitter is greatly improved by compensating the output for the temperature effects of the sensor module. This compensation is typically accomplished by characterizing the uncorrected output of the sensor module and developing a mathematical curve fit to produce a corrected sensor module output. Generally, corrected output compensation requires a sensor module design that incorporates an integral temperature sensor. The temperature sensor communicates with the sensor module electronics and provides an output to the electronics known as sensor temperature. This temperature sensor reading is used by the sensor module electronics to compensate the sensor module output.

Providing a multivariable process fluid pressure transmitter with improved temperature compensation abilities would render such devices more accurate. Accuracy is vitally important, and thus improvements in accuracy will benefit the art of process fluid measurement.

SUMMARY

A multivariable process fluid pressure transmitter includes an electronics module and a sensor module. The sensor module is coupled to the electronics module. A process fluid temperature sensor is coupled to the process fluid pressure transmitter. A differential pressure sensor is disposed within the sensor module and is operably coupled to a plurality of process fluid pressure inlets. A static pressure sensor is also disposed within the sensor module and is operably coupled to at least one of the process fluid pressure inlets. A first temperature sensor is disposed within the sensor module and is configured to provide an indication of a temperature of the differential pressure sensor. A second temperature sensor is disposed within the sensor module and is configured to provide an indication of a temperature of the static pressure sensor. Measurement circuitry is operably coupled to the differential pressure sensor, the static pressure sensor, and the first and second temperature sensors. A processor is coupled to the measurement circuitry and is configured to provide a compensated differential pressure output based on a measurement of the differential pressure sensor and the first temperature sensor, and to provide a compensated static pressure output based on a measurement of the static pressure sensor and the second temperature sensor.

DETAILED DESCRIPTION OF ILLUSTRATIVE EMBODIMENTS

Figure 1:
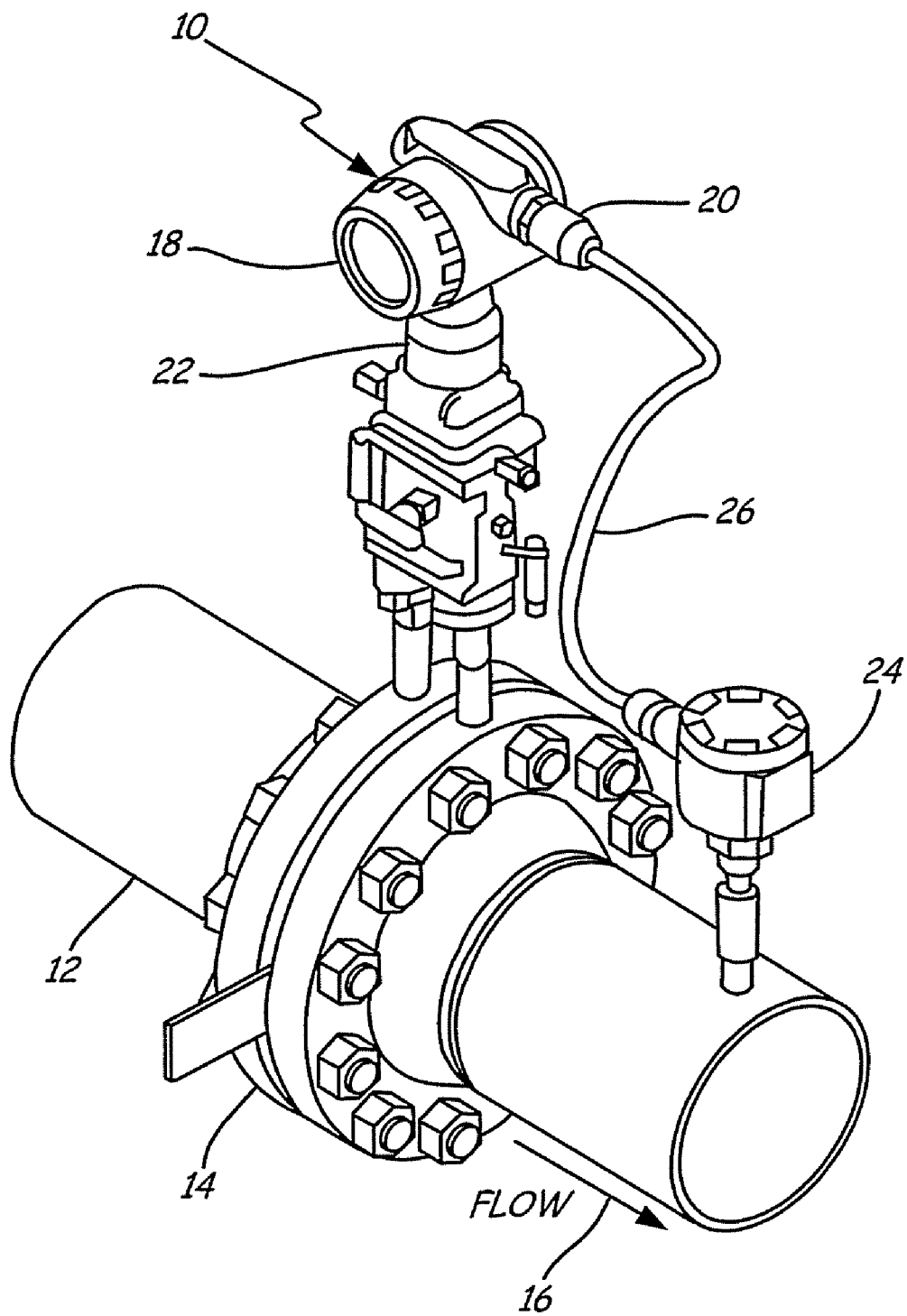
FIG. 1 is a diagrammatic view of a process fluid pressure transmitter with which embodiments of the present invention are particularly useful.

FIG. 1 is an illustration of a process fluid pressure transmitter with which embodiments of the present invention are particularly useful. Transmitter 10 is coupled to a pipe 12 through fitting or flange 14. Pipe 12 conducts flow of fluid, either a gas or a liquid, in the direction indicated by arrow 16.

Multivariable process fluid pressure transmitter 10 includes electronics module 18 and sensor module 22, which collectively house multivariable process fluid pressure transmitter 10. Electronics module 18 also preferably includes a process fluid temperature sensor input 20 for accepting an input from a resistive temperature device (RTD), preferably a 100 ohm RTD which is typically inserted directly into the pipe or into a thermowell which is inserted into pipe 12 to measure the process fluid temperature. The wires from the RTD are connected to one side of a terminal block in a temperature sensor housing 24. To the other side of the terminal block are connected wires which pass through conduit 26 and are coupled to transmitter 10 through input 20.

Sensor module 22 includes a differential pressure sensor and an absolute pressure sensor. The differential pressure sensor and absolute pressure sensor provide pressure signals to conditioning and digitizing circuitry, and to a linearizing and compensating circuit. The compensated, linearized and digitized signals are provided to electronics module 18. Electronics module 18 in transmitter 10 provides an output signal indicative of process conditions of the process fluid flowing through pipe 12 to a remote location, by a 4-20 mA two-wire loop preferably formed using twisted pair conductors, through flexible conduit 28. In some situations, transmitter 10 may provide signals which are indicative of multiple process variables (temperature, static pressure, and differential pressure) according to the HART® or FOUNDATION™ Fieldbus standards. Further, multivariable process fluid pressure transmitter 10 may also provide an output signal indicative of process fluid flow itself.

Figure 2:
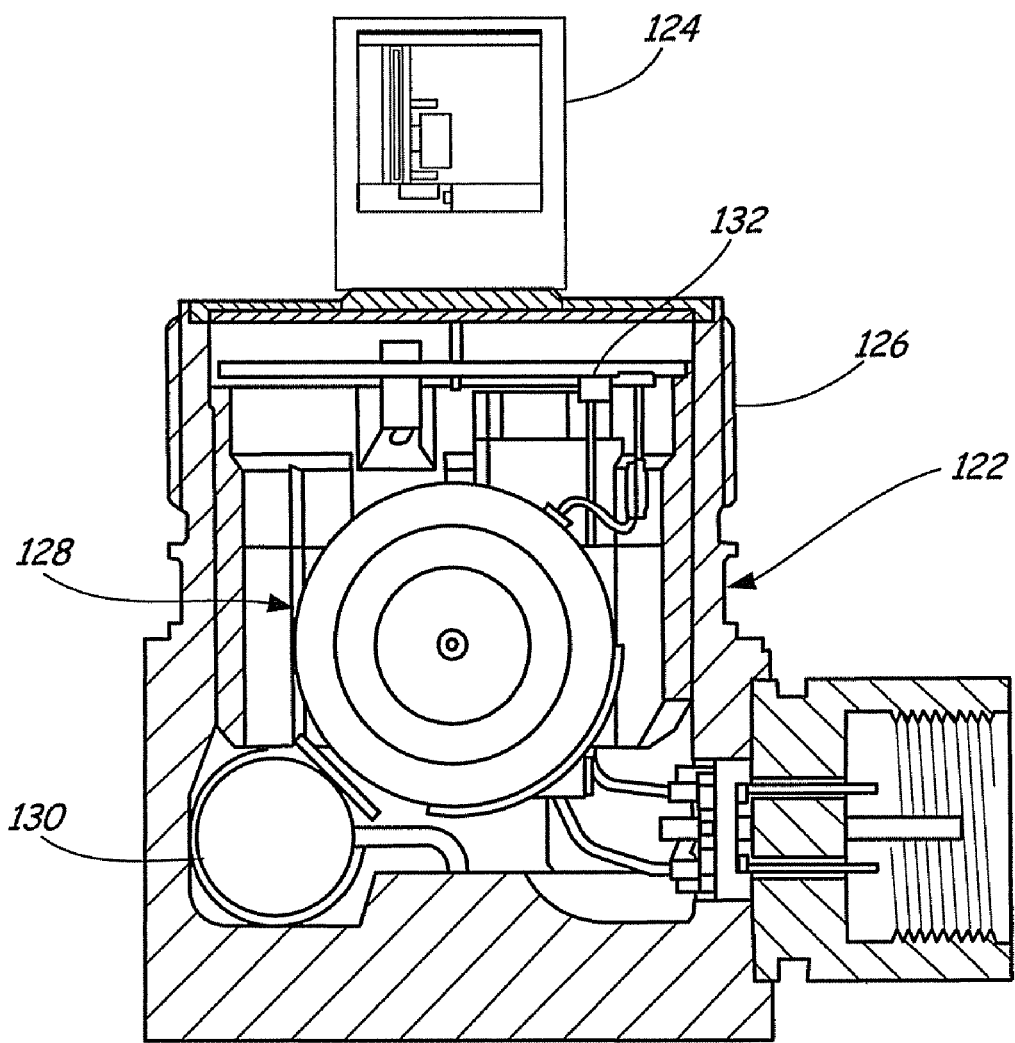
FIG. 2 is a cross-sectional diagrammatic view of a sensor module of a process fluid pressure transmitter in accordance with the prior art.

FIG. 2 is a diagrammatic view of a sensor module in accordance with the prior art. Sensor module 122 includes an electrical connector to 124 for coupling to an electronics module such as electronics module 18. Additionally, sensor module 122 also includes external threads 126 for mechanically coupling sensor module 122 to an electronics module. Sensor module 122 includes a differential pressure sensor 128 and static pressure sensor 130. Differential pressure sensor 128 is operably coupled to a pair of process fluid pressure inlets (not shown) to sense a differential pressure between those inlets. Typically, differential pressure sensor 128 will include a deflectable diaphragm that sealingly separates a pair of chambers to which each respective process fluid pressure is operably coupled. Differential pressure results in deflection of the diaphragm in one direction or another and the diaphragm deflection is generally sensed as a change in capacitance of the differential pressure sensor. However, other techniques for sensing diaphragm deflection can also be used. Static sensor pressure 130 is operably coupled to one of the process fluid pressures and provides an electrical indication of the static pressure of that process fluid.

Multivariable process fluid pressure transmitters that measure differential and static process fluid pressures often contain the two pressure sensors, as shown in FIG. 2, in the sensor module 122. Each pressure sensor 128, 130 in sensor module 122 has its own individual temperature-induced error. A single temperature sensor is generally provided in the prior art, as illustrated at reference numeral 132, which can provide an accurate measurement of the temperature of both differential and static pressure sensors 128, 130, respectively, under steady-state temperature conditions. However, when transient temperature conditions exist, and also when process fluid temperature deviates significantly from the ambient temperature of sensor module 122, temperature gradients between the differential and static pressure sensors 128, 130, can occur. When this happens, the temperature sensed by sensor 132 no longer accurately reflects the temperature of both sensors 128, 130. Accordingly, temperature-induced error in the output of one or both such sensors can be present.

Figure 3:
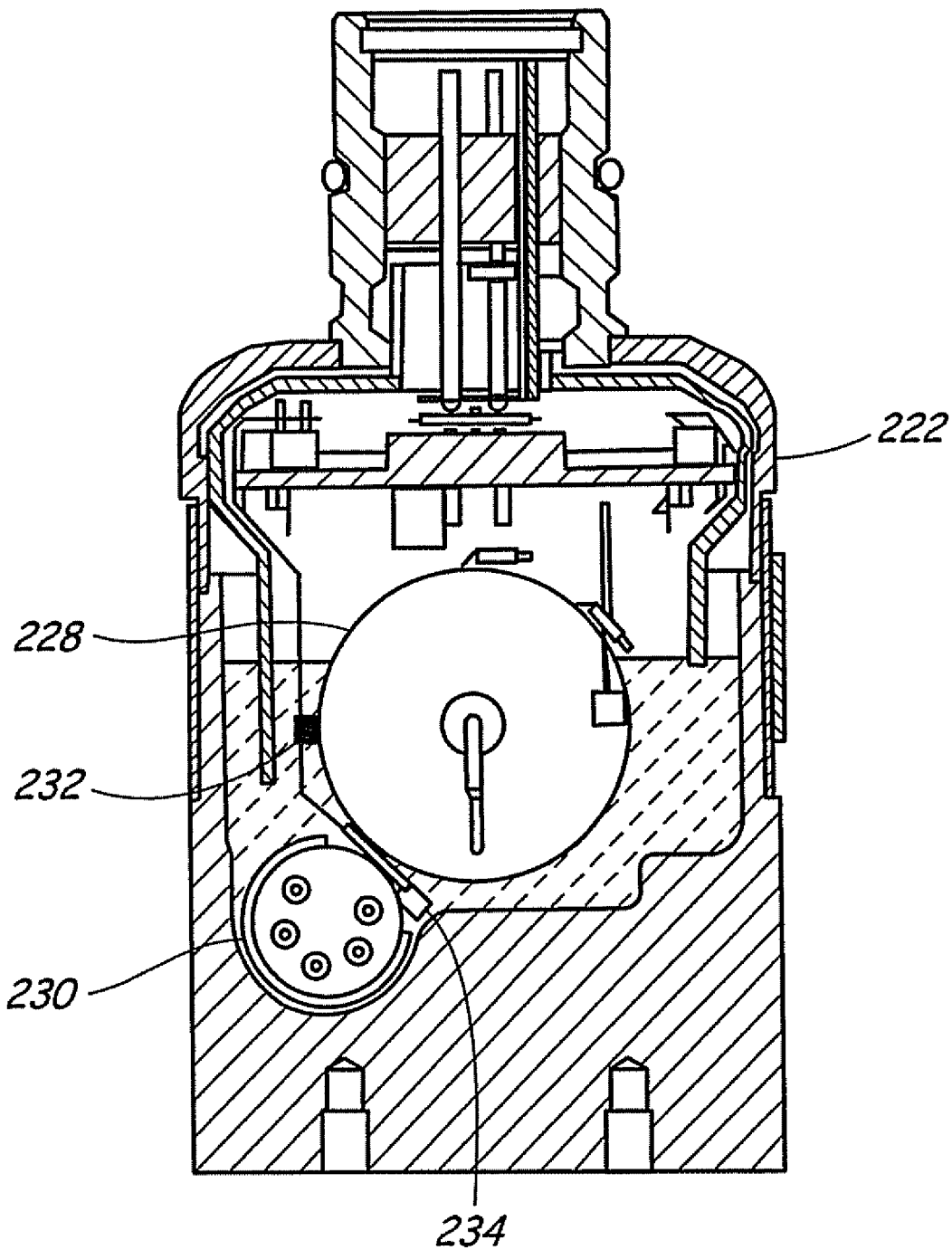
FIG. 3 is a cross-sectional diagrammatic view of a sensor module of a process fluid pressure transmitter in accordance with an embodiment of the present invention.

FIG. 3 is a cross sectional diagrammatic view of a multivariable process fluid pressure sensor module 222 in accordance with embodiment of the present invention. As in previous designs, sensor module 222 includes both a differential pressure sensor 228 as well as a static pressure sensor 230. However, unlike prior designs, each pressure sensor within sensor module 222 has a temperature sensor coupled directly to it. Differential pressure sensor 228 has temperature sensor 232 coupled directly thereto. Similarly, static pressure sensor 230 has temperature sensor 234 directly coupled to it. Temperature sensors 232, 234 can be any suitable temperature sensors including thermocouples, resistance temperature devices (RTDs), thermistors, or other suitable devices. The utilization of two temperature sensors 232, 234 reduces the temperature-induced errors under transient end process gradient conditions. Preferably, since prior designs characterize the output of each pressure sensor as a function of the measured sensor module temperature, embodiments of the present invention can be practiced by simply applying each respective temperature sensor measurement to a similar compensation calculation for each respective pressure sensor. Accordingly, calculation difficulty is the same as prior designs, with the exception that the calculation is simply performed twice, once for each pressure sensor with its respective temperature sensor measurement. While embodiments of the present invention have been described with respect to one temperature sensor on each pressure sensor, embodiments can be practiced by placing a plurality of such temperature sensors on one or both pressure sensors to more accurately measure pressure sensor temperature. Further, embodiments of the present invention can also be practiced by placing an additional temperature sensor simply in sensor module 222 to measure the temperature of the electronics in the event that temperature-induced effects can be measured and/or compensated with respect to any of the electronics disposed within sensor module 222. Further, although the embodiment illustrated in FIG. 3 illustrates direct temperature sensor measurements obtained for compensation, embodiments of the present invention can be practiced using indirect measurement from a temperature sensor, such as employing the bridge resistance of a strain gage sensor, for example.

Figure 4:
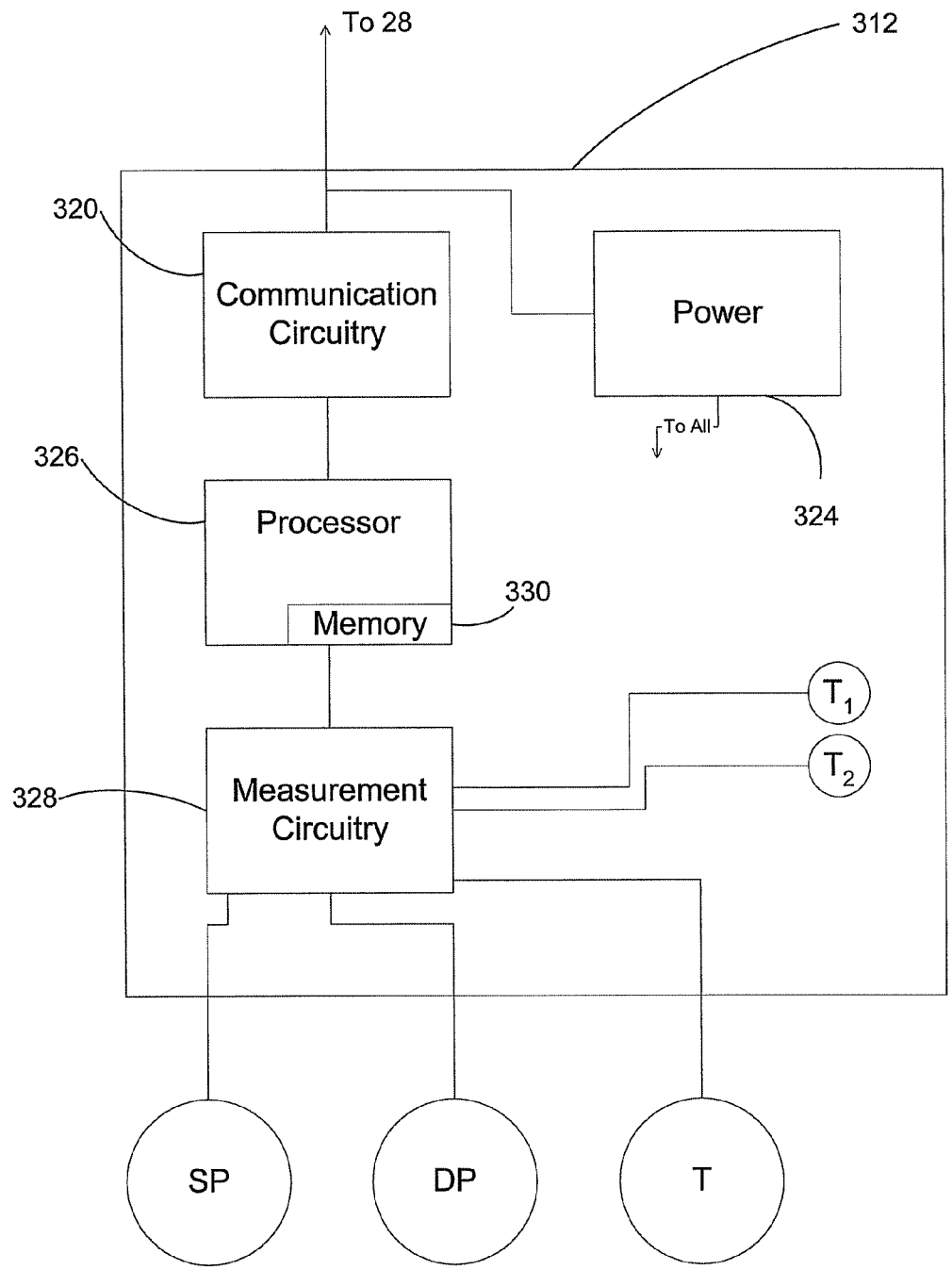
FIG. 4 is a diagrammatic view of a multivariable process fluid pressure transmitter in accordance with an embodiment of the present invention.

FIG. 4 is a block diagram of a multivariable process fluid pressure transmitter 312 with which embodiments of the present invention are particularly applicable. Transmitter 312 includes communication circuitry 320 operably coupleable to process communication loop 28. Communication circuitry 320 allows device 312 to communicate in accordance with a suitable process industry communication protocol, such as the HART® protocol described above, the FOUNDATION™ Fieldbus protocol, or any suitable process industry communication protocol. Transmitter 312 also includes power module 324 that is preferably coupleable to process communication loop 28. By coupling to process communication loop 28, device 312 may be able to operate wholly upon power received through the process communication loop. However, in some embodiments, power module 324 may be a power storage device, such as a battery or a supercapacitor, and in such embodiments power module 324 need not coupled to process communication loop 28. Power module 324 is configured to provide suitable electrical power to all components of transmitter 312, as illustrated by the arrow labeled "to all".

Transmitter 312 also preferably also includes processor 326 which is preferably a microprocessor that is operably coupled to communication circuitry 320 and power module 324. Microprocessor 326 executes instructions stored in memory to obtain measurements from measurement circuitry 328 and calculates information based upon such measurements. For example, processor 326 preferably obtains measurements with respect to static process fluid pressure (SP), differential process fluid pressure (DP), and process fluid temperature T and is able to provide or otherwise calculate process fluid flow parameters. Additionally, measurement circuitry 328 is also coupled to first temperature sensor $T_1$ and second temperature sensor $T_2$. As illustrated in FIG. 3, each of temperature sensors $T_1$ and $T_2$ is thermally coupled to a respective one of static pressure sensor 230 and differential pressure sensor 228. Accordingly, compensation of the static pressure measurement can be performed using any suitable technique relative to the temperature measured on static pressure sensor 230. Similarly, the differential pressure sensor measurement can be compensated based upon a direct measurement of the temperature of differential pressure sensor 232.

Figure 5:
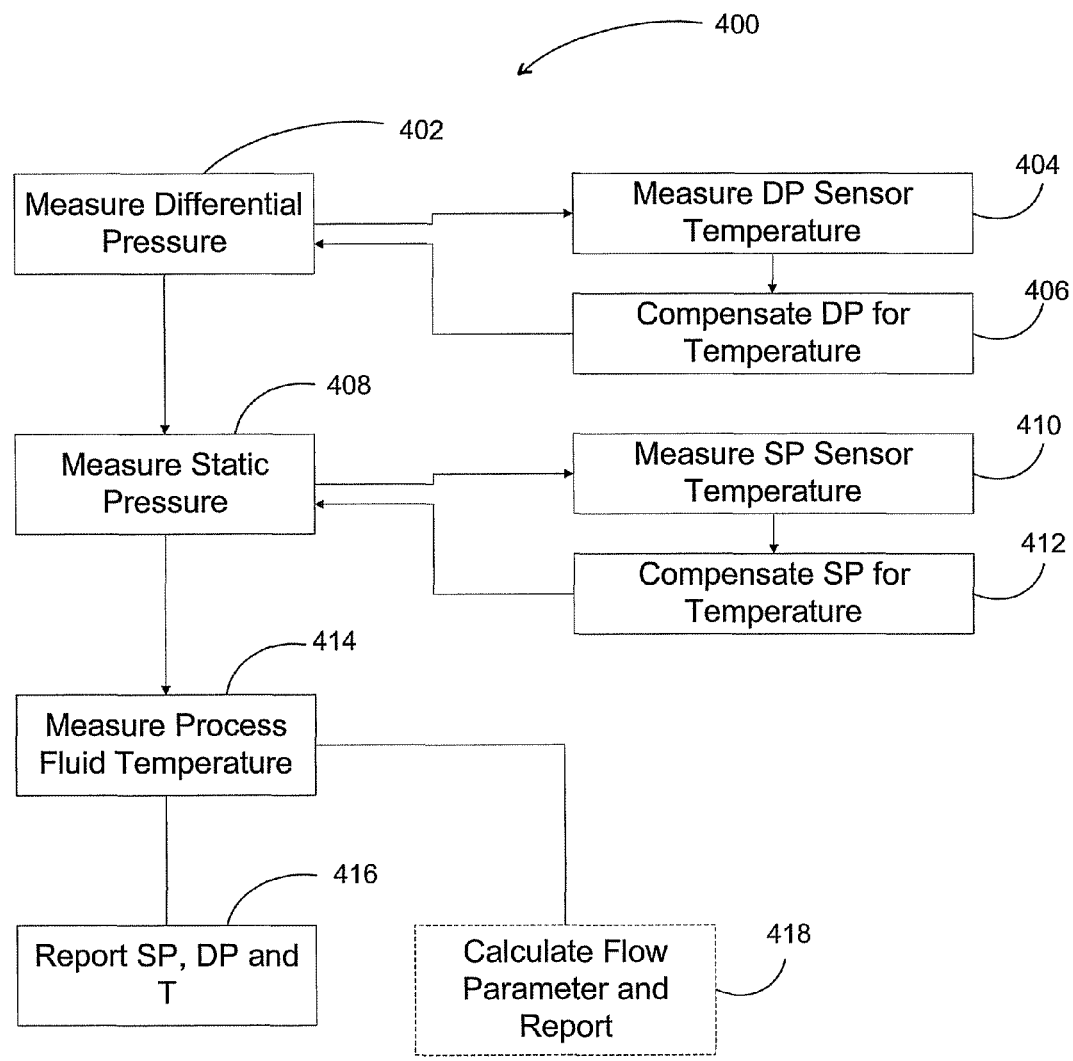
FIG. 5 is a flow diagram of a method of measuring multiple process fluid variables in accordance with an embodiment of the present invention.

FIG. 5 is a flow diagram of a method of obtaining a number of process fluid variables in accordance with an embodiment of the present invention. Method 400 begins at block 402 where a differential pressure of the process fluid is measured. Preferably, this differential pressure measurement is obtained from a differential pressure sensor, as shown in FIG. 3. Once the differential pressure is measured, the temperature of the differential pressure sensor is measured, as indicated at block 404. Then, the measured temperature is used to compensate the differential pressure reading for the measured temperature, as illustrated at block 406. This compensation can take the form of prior compensations using similar mathematic techniques, the primary difference being the direct correlation of the measured temperature to the pressure sensor to which the temperature corresponds. Once the compensation has been completed, control returns to block 402 which ultimately passes to block 408 where static process fluid pressure is measured. Similarly, once the static process fluid pressure is measured, control passes to block 410 where the temperature of the static process fluid pressure sensor is measured. Once this measurement is complete, control passes to block 412 where a compensation of the static pressure based upon the measured temperature is provided. Once this compensation is complete, control returns to block 408 and ultimately to block 414 where the process fluid temperature is measured. This process fluid temperature is measured using a process temperature sensor, such as that illustrated in FIG. 1 at reference numeral 24. Once the compensated differential pressure and static pressure are obtained along with the process fluid temperature, the parameters can be reported over a process communication loop, such as process communication loop 28, as illustrated in block 416. Optionally, higher-order calculations, such as process fluid volumetric flow and/or mass flow can be calculated and optionally reported over the process communication loop.

Although the present invention has been described with reference to preferred embodiments, workers skilled in the art will recognize that changes may be made in form and detail without departing from the spirit and scope of the invention.

What is claimed is:

1. A multivariable process fluid pressure transmitter comprising:
    an electronics module;
    a sensor module coupled to the electronics module;
    a differential pressure sensor disposed within the sensor module and being operably coupled to a plurality of process fluid pressure inlets;
    a static pressure sensor disposed within the sensor module and being operably coupled to at least one of the process fluid pressure inlets;
    a first temperature sensor disposed within the sensor module and configured to provide an indication of a temperature of the differential pressure sensor;
    a second temperature sensor disposed within the sensor module and configured to provide an indication of a temperature of the static pressure sensor;
    measurement circuitry operably coupled to the differential pressure sensor, the static pressure sensor and the first and second temperature sensors;
    a processor coupled to the measurement circuitry and configured to provide a compensated differential pressure output based on a measurement of the differential pressure sensor and the first temperature sensor, and to provide a compensated static pressure output based on a measurement of the static pressure sensor and the second temperature sensor.

2. The transmitter of claim 1, and further comprising a process fluid temperature sensor coupled to the measurement circuitry.

3. The transmitter of claim 2, wherein the processor is configured to provide an indication of process fluid flow based on the compensated differential pressure, compensated static pressure and process fluid temperature.

4. The transmitter of claim 1, wherein the first temperature sensor is a resistance temperature device.

5. The transmitter of claim 1, wherein the first temperature sensor is a thermocouple.

6. The transmitter of claim 1, wherein the second temperature sensor is a resistance temperature device.

7. The transmitter of claim 1, wherein the second temperature sensor is a thermocouple.

8. The transmitter of claim 1, and further comprising communication circuitry disposed within the electronics module and being configured to communicate process fluid information over a process communication loop.

9. The transmitter of claim 8, wherein the transmitter is wholly powered by the process communication loop.

10. A method of measuring process fluid parameters, the method comprising:
    measuring a process fluid differential pressure using a differential pressure sensor;
    measuring a temperature of the differential pressure sensor;
    compensating the measured differential pressure based on the measured temperature of the differential pressure sensor;
    measuring a process fluid static pressure using a static pressure sensor;
    measuring a temperature of the static pressure sensor;
    compensating the measured static pressure based on the measured temperature of the static pressure sensor; and
    providing an output based at least on the compensated differential pressure and the compensated static pressure.

11. The method of claim 10, and further comprising measuring a temperature of the process fluid.

12. The method of claim 11, wherein the output is based on the compensated differential pressure, the compensated static pressure and the measured process fluid temperature.

13. The method of claim 12, wherein the output is a process fluid flow output.

14. The method of claim 10, wherein compensating the measured differential pressure includes employing a mathematical curve fit as a function of the measured temperature of the differential pressure sensor.

15. The method of claim 10, wherein compensating the measured static pressure includes employing a mathematical curve fit as a function of the measured temperature of the static pressure sensor.

* * * * *